3,398,075
METHOD OF MAKING TELOMERS BY MEANS OF NUCLEAR RADIATION
Edwin O. Guernsey, Pennington, N.J., and William E. Smith, Levittown, Pa., assignors to Mobil Oil Corporation, a corporation of New York
Filed Oct. 2, 1963, Ser. No. 313,265
15 Claims. (Cl. 204—162)

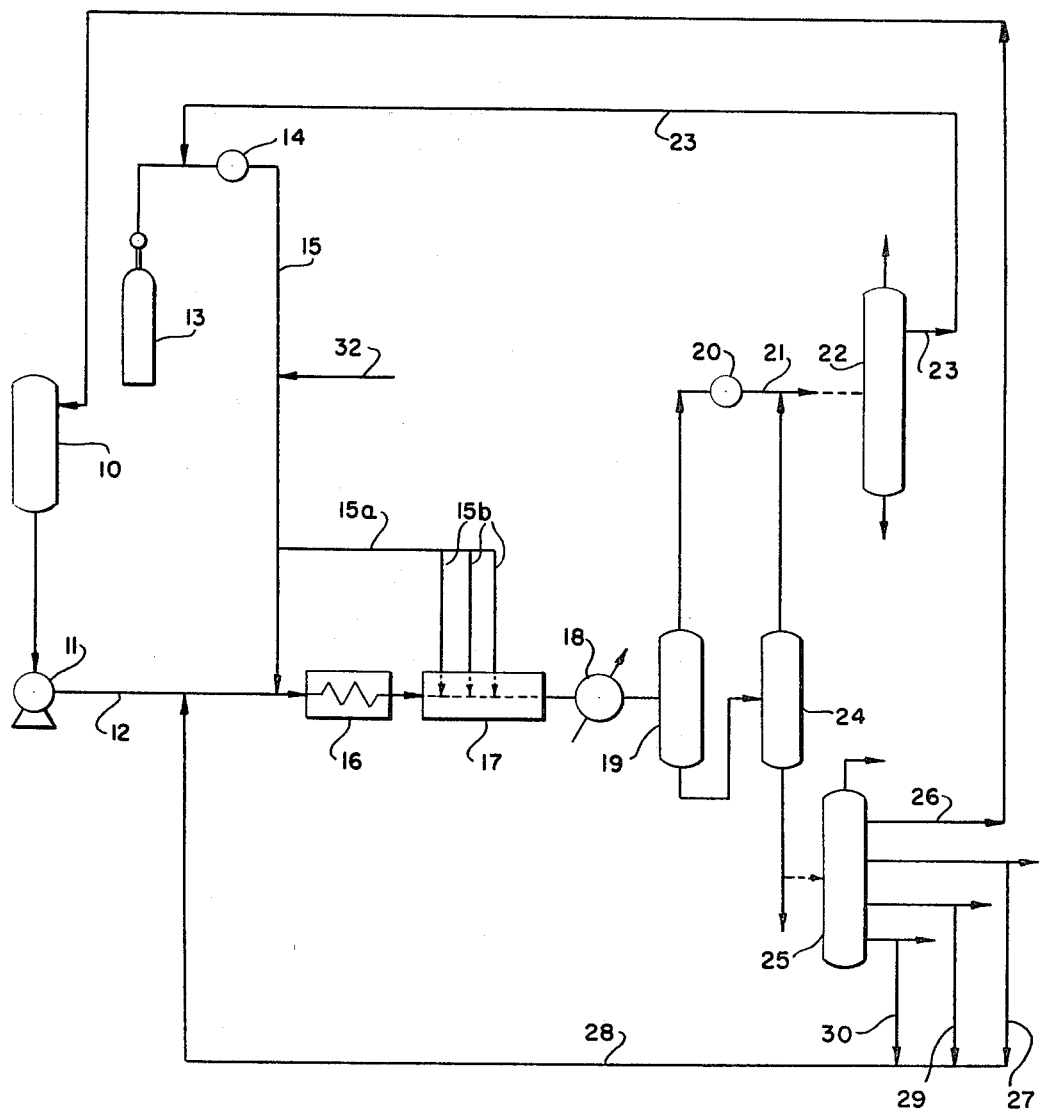

This invention relates to a process for making telomers, particularly alcohols, by the telomerization of an olefin with an alcohol of lower molecular weight than the telomer products. The invention particularly relates to a process wherein the reactants are in the vapor phase and the reaction is initiated and carried out by the application thereto of high energy ionizing radiation.

The alcohol products or telomers are those having at least 5 carbon atoms and going up to about 10 or 12 carbon atoms. They have broad utility as solvents, as intermediates for detergents, plasticizers, etc., and in other ways.

Telomerization reactions of this type have been carried out heretofore in more or less conventional ways, that is, in the presence of catalysts and at elevated temperatures and pressures. In some cases special equipment is necessary. The catalysts have included peroxides, azo compounds, amines, and metal salts, and have of course involved steps for their removal from the products. In the case of peroxides the reaction is difficult to control and is recognized as having an explosive character, raising problems of heat removal. Azo compounds require careful handling. Temperatures and pressures have been fairly severe, the temperatures ranging to 400° C. or more and the pressures to 3000–6000 p.s.i. or more.

Telomerization reactions have also been conducted by aid of ionizing radiation but in static or capsule systems and with reaction times extending for many hours and even days. Product formation has been low and in some cases product in the form of waxy solids has been obtained. Of interest is the fact that these prior reactions were carried out in a liquid phase.

As described, the process of this invention comprises irradiating the reactants in the vapor phase. A particular advantage of this procedure is that telomer yields per unit of radiation absorbed are substantially greater than those obtained in a liquid phase process. This result is considered to have been unpredictable. Another advantage is that the gaseous reactants are exposed to the radiation for short times, generally only a few seconds and in any event less than one or two minutes. A flowing system is feasible. More particularly, it has been found that by using reactants in the vapor phase in a flowing system, and by irradiating for short times, a substantial yield of telomers can be obtained. Among other advantages, there is little waste of reactants. Furthermore, mild conditions of temperature and pressure are suitable, the pressure being approximately atmospheric, or just enough to bring about flow, while the temperature is sufficient to maintain the vapor phase.

Besides telomers, for which the selectivity is good other potentially valuable products are formed, including hydrogen. Acetone is a by-product of the reaction between isopropanol and ethylene. Of importance is the fact that the radioactivity induced in the products is negligible.

In general, and as will become apparent, the invention makes it possible to utilize radiation to initiate the telomerization and takes advantage of this flexible and efficient means to achieve good results using conditions of temperature and pressure under which the conventional reactions do not proceed. The invention further permits a power nuclear reactor, with its large radiation potential, to be used to supply the radiation.

The method of the invention broadly comprises mixing the reactants, heating them sufficiently to place them in the vapor phase, flowing the mixture through a zone of ionizing radiation where they absorb radiation, removing and cooling the same, and separating the products.

More particularly, the method may be illustrated by referring to the drawing in which a diagramamtic flow system is shown and in which the flow may be described in connection with the reaction of isopropanol and ethylene to form telomers comprising tertiary alcohols having at least 5 carbon atoms. It will be understood that the flow is applicable to other reactants.

A supply of isopropanol is provided at 10 from which alcohol is withdrawn by proportioning pump 11 and mixed in line 12 with ethylene from tank 13. Meter 14 in line 15 measures the ethylene. The mixture is preheated in zone 16 and passed into radiation zone 17 at a temperature of 100–300° C. and a pressure of 1–10 atmospheres. A useful although not essential procedure is to pass at least part of the ethylene through line 15a and to admit the same to zone 17 at one or more additional points as indicated at 15b. This enables the initial concentration of ethylene in line 12 to be maintained lower than otherwise; that is, it avoids high initial ethylene concentrations in the stream entering the radiation zone and thus may favor the production of desired telomers, such as the 1:1 telomer. Also, the procedure is useful to avoid too rapid ethylene depletion as the reactants move through the radiation zone. If desired, higher telomers may be favored by increasing the ethylene flow to zone 17.

Zone 17 may comprise any suitable source of high energy ionizing radiation having means to permit passage therethrough, or in effective relationship therewith, of the reactants while they are being irradiated. Desirably this source is a nuclear reactor, and the reactants may pass through a conventional beam tube or other suitable instrumentality to receive the nuclear radiation. Following irradiation, the reaction mixture is withdrawn from zone 17, cooled in condenser 18, and initially separated in high pressure separator 19 into gaseous and liquid products. Gaseous products, comprising hydrogen and C–1 to C–5 hydrocarbons, are reduced in pressure by passage through regulator 20 and then may be passed to line 21 to any desired further treatment, suitable to a separator 22 where unreacted ethylene may be recovered and recycled through line 23 to the ethylene feed line Any entrained heavier material may be removed from the bottom of zone 22.

The liquid fraction from separator 19 flows to low pressure separator 24, where additional gaseous material may be removed and passed to line 21, and normally liquid products recovered as bottoms and, if desired, sent to fractionator 25 for separation into individual telomers and other products and for recovery of any unreacted isopropanol, which may be recycled by line 26. Gaseous material, if present, may also be removed.

Telomer products may comprise the following compounds:

| Telomer: | Compound |
|---|---|
| 1:1 | 2-methyl-2-butanol. |
| 1:2 | 2-methyl-2-hexanol. |
| 1:3 | 2-methyl-2-octanol. |
| 1:4 | 2-methyl-2-decanol. |

Higher telomers may also be formed. Each of these products may be recovered and removed for separate use; and it is feasible to return any one of them, or a mixture of any two or more, to the process to constitute the starting alcohol feed. Thus, as the 1:1 telomer is returned as by lines 27 and 28 to line 12 and is reacted in zone 17 with ethylene, higher molecular weight alcohol products may be formed. Similarly, even higher alcohols may be obtainable by returning the 1:2 and 1:3 telomers as by lines 29 or 30, respectively, and line 28. It will be understood that a suitable arrangement of valves are provided to permit the flows described.

Considering the process in more detail in respect of the reactants and conditions, the starting alcohol may be a low molecular weight saturated aliphatic alcohol having about 1–6 carbon atoms and preferably having a tertiary hydrogen atom and the OH group on the same carbon atom. Such alcohols, which tend to exhibit greater reactivity and enable milder conditions to be employed, include isopropanol, 2-butanol, 3-methyl-2-butanol, 2- and 3-pentanols, 3-methyl-2-pentanol, 4-methyl-2-pentanol, 2- and 3-hexanols, etc. Another preferred group comprises the C–1 to C–6 alcohols having a tertiary H atom and the OH group on different carbons, such as 2-methyl-1-propanol, the 2- and 3-methyl-1-butanols, the 2-, 3-, and 4-methyl-1-pentanols, 2-ethyl-1-butanol, etc. Other preferred groups are like the two preceding ones but have 7-12 carbon atoms. Still other useful alcohols are those having secondary H atoms attached either to an OH-containing carbon, as is preferred, or to another carbon and containing up to 12 carbons. Illustrative of the last group are ethanol, propanol, 1-butanol, 1-pentanol, 1-hexanol, 1-heptanol, 1-octanol, 1-nonanol, 1-decanol, 1-undecanol, and 1-dodecanol. Methanol is useful, even though it has no secondary hydrogen atoms. Telomers may be used as the starting alcohol, as described, thereby making possible the production of higher molecular weight alcohols. Polyhydroxy alcohols may be suitable, including glycols like ethylene glycol, propylene glycol, butanediols, glycerol, etc. Still other starting materials are alicyclic alcohols like menthol and aromatic alcohols like the 1- and 2-phenylethanols, benzyl alcohol, diphenylcarbinol, and the like.

The starting olefin is preferably a low molecular weight 1-olefin having 2–6 carbon atoms, but also going up to 12 carbons, and including ethylene, propylene, the various butenes, pentenes, hexenes, etc. Other useful materials are aliphatic olefins having the double bond in non-terminal positions, such as 2-butene, 2- and 3-pentene, and the like. Diolefins like butadiene and aromatic olefins like styrene are suitable.

The concentration of alcohol with respect to olefin is desirably in an overall range of 5:1 to 30:1, alcohol to olefin, molar basis, and more broadly from 1:1 or 0.5:1 up to about 40:1. The level of concentration of alcohol is variable, depending on the equipment size, as will be understood. At these ratios useful telomers tend to form in good yields. Even wider ratio ranges are suitable, depending on the particular product desired, since the ratio is not dependent on the solubility of the reactants in each other nor on the temperature or pressure. Higher ratios favor formation of lower telomers, and lower ratios favor higher telomers. For example, for a good yield of 1:3 telomer, the ratio should be smaller than for a 1:2 telomer; and for a 1:2 product it should be less than for a 1:1 product. While sharp limits are difficult to draw, generally speaking good yields of lower telomers may be obtained at ratios of 15:1 to 20:1 and higher, while good yields of higher telomers are obtainable below these ratios.

Actual flow rates of the reactants will depend on the equipment size, but regardless of the size the exposure time of the reactants to the radiation is less than two minutes and generally less than one minute, with preferred times extending from 10 to 15 seconds to 40 or 45 seconds.

Lower pressures are preferred, suitably at or near atmospheric and extending, say, from 0.1 to 0.2 to 1 or 2 atmospheres. The advantage of such lower pressures is to permit lower temperatures in the reaction zone. The process is operable at greater pressures, going up to 10 atmospheres or more. A useful pressure is one sufficient to move the reactants through the equipment at a desired rate.

Lower temperatures are favored to provide mild conditions, but the temperature should be adequate to maintain the vapor phase. Thus temperatures may range from just above the boiling point of either reactant to a somewhat greater value. Temperatures from 100 to 200° C., and also in the range of 200 to 300° C., have been found operable.

High energy ionizing radiation of any kind and from any suitable source may be used to irradiate. Such radiation is intended to embrace both ionizing particle radiation and ionizing electromagnetic radiation; the former includes accelerated electrons, nuclear particles like protons, fast neutrons, alpha and beta particles, deuterons, fission fragments, and the like; and the latter includes gamma rays and X-rays. The radiation may be obtained from various sources, incuding natural radioactive materials, which emit alpha, beta, and gamma radiation; from nuclear reactors. The charged particles may be brought power is generated, these by-products including elements having atomic numbers ranging from 30 to 63; from materials made radioactive by exposure to neutron radiation, such as cobalt-60, cesium-137, sodium-24, manganese-56, gadolinium-72, lanthanum-140, etc.; or from operating nuclear reactors. The charged particlest may be brought to high energy levels by acceleration in conventional devices. For example, high speed electrons having energies of 0.5 to 15 mev. can be supplied by Van de Graaff generators, resonant transformers, linear accelerators, etc. High energy X-ray machines are a source of X-rays.

A preferred radiation is that from a nuclear reactor, comprising neutrons and gamma rays, described below, or the gamma radiation from cobalt-60.

A practically useful energy level for the foregoing radiation is 1 mev., although the level may range from 0.5 to 15 mev., and more broadly from 1 kev. to 20 or 30 mev. It will be understood that the invention is not dependent on the energy level or on dose rate of the radiation, which may be as low as is effective and as high as desired.

Total radiation applied to the reactants is at least about 0.02 megarad, and a suitable range is 0.1 to 0.5 megarad. Higher total doses are possible, going to 1, 2, or even 20 to 30 megarads. The table below may illustrate other desirable ranges. The radiation may be applied at a rate of 1 or 2 up to 15 or 20 megarads/hr., although higher dose rates are feasible, going to about 30 or 40 megarads/hr.

Yields of total telomer product, reported throughout in terms of G value (number of molecules/100 electron volts of radiation energy) are variable but may approximate 300, and may range from 50 to 300. Yields of individual telomers are illustrated in the table below. Other useful products are formed, including hydrogen. With isopropanol and ethylene as reactants, acetone is a valuable by-product and may be recovered by distillation of the liquid products. With 2-butanol and ethylene as reactants, the products may include 3-methyl-3-pentanol, 3-methyl-3-heptanol, etc. With methanol and ethylene, products comprising alcohols with 3, 4, and more carbon atoms are obtainable. Isopropanol and propylene give alcohols with at least 6 carbons.

The invention may be illustrated by the following examples.

Examples 1–5

A number of runs were carried out in which isopropanol and ethylene were reacted by means of the nuclear radiation of an operating nuclear reactor comprising a 5 megawatt nuclear research reactor. The chemical reaction was carried out in a reaction zone or vessel disposed in a conventional beam tube which extended to one core face of the nuclear reactor. The inner end of the beam tube had a diameter of 6 inches and was exposed to the reactor core. The chemical reaction zone comprised a cylindrical vessel having an inlet at one end and an outlet at the other end, the latter being disposed nearer to the core face. Liquid isopropanol was removed from a burette at a measured rate and pumped through an inlet line leading to the reaction vessel. Before reaching the latter, it was joined by a stream of ethylene the amount of which was measured by means of a rotameter. The ethylene was taken from a conventional high pressure cylinder. The reactant mixture entered the reaction vessel through a preheater coil disposed in the first half of the vessel, and then passed into the vessel itself where it received the nuclear radiation. The mixture left the inner end of the reaction vessel through an outlet line which brought the mixture out of the beam tube to a water-cooled condenser and then to a high pressure liquid-gas separator. The gas was removed from the latter through a pressure regulator and recovered by conventional water displacement apparatus. The liquid from the separator was removed to a low pressure separator where further quantities of gas were withdrawn and the liquid product recovered.

Gas samples were analyzed in an isothermal two-column two-detector gas chromatograph. Non-condensable gases were separated from hydrocarbon products having up to 5 carbon atoms, and the latter were separated one from another. Liquid products were analyzed in an F & M temperature-programmed chromatograph using a thermal conductivity detector to perform the analyses. A 5-microliter sample of each liquid product was inserted in the chromatograph and a chromatographical trace obtained. This was then compared with previously prepared traces obtained by running known mixtures in the chromatograph.

A total of 5 runs were made at varying conditions. Pertinent data appear in the following table.

|  | Example No. | | | | |
|---|---|---|---|---|---|
|  | 1 | 2 | 3 | 4 | 5 |
| Run No. | 8 | 9 | 10 | 12 | 19 |
| Temperature, °C | 204 | 286 | 176 | 260 | 206 |
| Pressure, p.s.i. | 115 | 116 | 116 | 65 | 115 |
| Isopropanol, moles/hr | 3.11 | 3.08 | 3.03 | 3.09 | 4.20 |
| Ethylene, moles/hr | 0.15 | 0.15 | 0.15 | 0.15 | 0.30 |
| Isopropanol:ethylene, mole ratio | 20.7 | 20.6 | 20.2 | 20.6 | 14 |
| Flow rate, gaseous cc./hr | 4.52 | 5.21 | 4.11 | 8.88 | 6.28 |
| Residence time, sec | 36.4 | 31.6 | 40.1 | 18.6 | 26.3 |
| Reactor power level, m.w.s. | 4.4 | 4.44 | 4.64 | 4.91 | 4.48 |
| Position of chemical reactor in beam tube, cm. from core face | 30.5 | 30.5 | 33.0 | 18.4 | 30.5 |
| Dose rate, mrad/hr | 16.7 | 16.9 | 15.75 | 41.5 | 17.0 |
| Total dose, mrad | 0.169 | 0.148 | 0.176 | 0.214 | 0.124 |
| Energy absorbed, $10^{19}$ ev./g. | 1.052 | 0.928 | 1.10 | 1.338 | 0.774 |
| G values: | | | | | |
| 1:1 Telomer | 235 | 107 | 187.5 | 56.4 | 96.5 |
| 1:2 Telomer | 33.3 |  | 24.9 |  | 15.8 |
| 1:3 Telomer | 4.22 |  |  |  | 5.14 |
| Total Telomer | 272.5 | 107 | 212.4 | 56.4 | 117.4 |
| Ethylene to telomer | 314.3 | 107 | 237.3 | 56.4 | 143.5 |
| Acetone | 7.07 | 41.8 |  | 42.7 |  |
| Hydrogen | 638 | 1,120 | 436 | 327 |  |
| Total gas | 690 | 1,200 | 465 | 374 |  |

Considering the table, it may be seen (runs 8 and 10) that yields of 1:1 telomer are high at temperatures approximately 200° C. At a higher temperature (run 9) the 1:1 telomer yield falls off. By again reducing the temperature to about 200° C. (run 19), the yield of 1:1 product may be increased, but a decreased alcohol:ethylene ratio prevents the 1:1 yield from reaching the high levels of runs 8 and 10. Yields of 1:2 telomer are good. Regarding the 1:3 telomer, it is considered that the increased ethylene concentration may be reflected in the increased yield of telomer. The good selectivity for total telomer production is demonstrated by the G values of 272.5 for total telomer and 314.3 for ethylene conversion to telomers.

The G values for the 1:1 telomer noted in the table are to be compared with G values of 12 to 67 for the same telomer obtained by irradiating isopropanol and ethylene in a liquid phase flowing system in the same equipment used for the vapor phase work. In the liquid phase, the temperature ranged up to 110° C., the pressure was about 214 p.s.i., the moles of alcohol per hour about 3.0 to 3.1, the moles of ethylene per hour about 0.15 to 0.45, and the mole ratios varied from 7 to 21. The residence times were 0.15 to 0.55 hour, or about 30 to nearly 50 times greater. Dose rates were in the same range, 13 to 37 megarads/hour; but total dose was higher, about 1.9 to 20 megarads or about 15 to nearly 100 times greater. As is apparent, the best G value of 1:1 telomer in the vapor phase was 3.5 times greater than the best G value in the liquid phase. The G's of 1:2 telomer were also better, ranging from 16 to 33 as against 4.5 to 21 in the liquid phase. The G values of 1:3 telomer in the liquid phase ranged from 2 to 8.5, or slightly lower and slightly higher than the vapor phase values.

The radioactivity induced in the products by exposure to the mixed neutron and gamma radiation of the nuclear reactor is negligible. Small samples of liquid product from run 12 were counted in a multi-channel pulse-height analyzer at 3 and 5 months following exposure. Gamma activity was found to be only 10 micromicrocuries/cc. and was determined to be that of Fe–59, probably picked up from the reaction vessel. For comparison, the maximum permissible concentration (AEC regulations) for discharge of Fe–59 dissolved in water is 11 micromicrocuries/cc., at which level the water is judged to be potable.

As noted, the preferred radiation is that supplied by a nuclear reactor, particularly such radiation in which the fission fragments are prevented from reaching the chemical reactants, and as will be apparent, this radiation comprises mainly neutrons and gamma rays. The chemical reaction is suitably carried out in a chemical reaction zone which is exposed to this radiation, with means being provided to shield the reactants from nuclear fission fragments. The use of this mixed neutron and gamma field not only takes advantage of the fact that a nuclear reactor comprises a source of large radiation potential, but also of the finding that the reaction mixture has no appreciable radioactivity. Furthermore, it is possible to position the chemical reactor movably with respect to the core of the nuclear reactor and to control the radiation dose by simply changing the position of the chemical reactor relatively to the adjacent reactor core.

Besides alcohols, which in the telomerization reactions described are referred to as telogens, other telogens with which the invention may be practised are aldehydes and organic amines.

As in the case of alcohols, many aldehydes contain tertiary H atoms, such as 2-methylpropanal, 3-methylbutanal, etc., and these comprise a preferred group. Preferably the aldehyde has up to 12 carbon atoms.

Similarly, aliphatic monoamines having 1 to 6 or 1 to 12 carbons and containing a tertiary H atom represent a desirable group of telogens for reaction with an olefin. Illustrative of the group are 2-aminopropane, 1-amino-2-methylpropane, 2-aminobutane, etc. Amines containing secondary H atoms, are suitable. Both primary and secondary amines are to be understood as included within the foregoing definitions. Also useful are diamines like 1,2-diaminopropane and aralkylamines like methylaniline.

While the invention has been described in terms of the direct absorption of the radiation energy by the reactants, it is capable of making use of energy transfer substances, i.e., substances which absorb energy from the radiation and then transfer it to the reactants. These substances may, for example, comprise a rare gas or a solid of high surface area.

In the case of rare gases, materials like argon, helium, neon, and xenon may be useful. The gas is desirably present in the reactants in sufficient concentration so that a very large fraction of the energy absorbed in the reactant system is absorbed in the rare gas. Suitably the concentration of rare gas is 50 mole percent and up, based on the reactant mixture, preferably 50 to 75%, although it may range to about 90%. For example, a reactant mixture having an alcohol:olefin mole ratio of 5:1 and containing 50 mole percent of rare gas, would have the following composition in mole percent: alcohol 41.7, olefin 8.3, and rare gas 50. To make use of the rare gas in an isopropanol-ethylene reactant mixture, the energy absorbed in the rare gas is transferred to the reactants, the transfer mechanism being visualized as involving the ionization of the rare gas followed by an ion-molecule reaction in which reactive $C_3H_7OH^+$ is created. It is desirable that the ionization potential of the rare gas matches that of the isopropanol as closely as possible. The ionization potential of isopropanol is about 16.6 volts, whereas the rare gases have the following values: argon 15.79, helium 24.46, krypton 14.00, neon 21.53, and xenon 12.15. These values are taken from "Electron Impact Phenomena," Field and Franklin, Academic Press, 1957. It is apparent that argon, krypton, and xenon would be capable of transferring to the isopropanol nearly enough energy to ionize it and make it reactive, while helium and neon are capable of transferring more than enough energy to ionize the isopropanol although the amount is not excessive. An advantage of transferring to the isopropanol an amount of energy approximating the value of its ionization potential, as the foregoing rare gases are capable of doing, is that the tendency for competing and otherwise undesirable reactions to occur may be reduced. Competing reactions tend to be favored when the amount of energy absorbed by the reactants is excessive. Such reactions also involve the loss of reactants.

It should also be noted that the selection of a suitable rare gas is affected by its nuclear characteristics, particularly its neutron capture cross section and the resultant radioactivity. Thus, xenon has an appreciable cross section of 120 barns and gives rise to several radioactivities; while krypton, although having a much smaller cross section, produces a long-lived beta emitter, Kr–85. Argon has a small cross section and gives a short-lived radionuclide having a half life of only 1.93 hours, while neon also produces only short-lived activity and helium produces none. In these respects, therefore, argon, neon, and helium are acceptable, with argon being the preferred material. Xenon may also be useful.

Among other advantages provided by the addition of a rare gas to the reactants are the following: an increased freedom to vary the alcohol:olefin mole ratio without suffering inefficiencies in the utilization of the radiation; the possibility of obtaining increased yields of desired product; and the capacity to raise the density of the gas phase without condensing the alcohol.

Certain solids of high surface area, particularly microporous solids, are also radiation energy absorbers and function to transfer energy to the reactants. They have an advantage in being able to absorb a relatively large amount of energy, thus providing a system or reservoir of large energy content such that increased efficiency in the use of the radiation energy is possible and the radiation can be reduced in intensity. The reactants are simply irradiated while in contact with the solid contact material. The latter is preferably inorganic and relatively stable, that is, it does not disintegrate as a result of exposure to radiation or of radioactivity occurring therein and is capable of retaining its form and strength under the conditions of use. In general, the material should have a relatively low thermal neutron capture cross-section, below about 10 barns and preferably below 0.5 barn. The material is porous, having a surface area broadly within the range of 5 to 1,500 square meters per gram and preferably 50 to 700 square meters per gram. The solids may have a pore volume within the range of 5 to 70%, preferably 30 to 50%, with pore radii from about 4 Angstroms to 100 microns. The particle size of the solids is variable, but an illustrative size is 60 to 200 mesh. Microporous contact materials are a desirable group, the term "microporous" referring to porous solids having at least 5% of their volume as pores and at least 25% of the total pore volume comprising pores having radii less than about 100 Angstroms.

Some specific solids include silica, alumina, silica-alumina, silica-magnesia, oxides of calcium, barium, magnesia, nickel, iron, and the like. Gel-types solids are useful, as obtained by drying hydrated oxides such as alumina, silica, titania, zirconia, magnesia, and zinc aluminate. Also useful are the zeolites, both natural and synthetic, and including those which act as molecular sieves, having pores of uniform and generally very small size, say 4 to 20 Angstroms; examples are chabazite, analcite, faujasite, acadialite, gmelinite, heulandite, natrolite, stilbite, thomsonite mordenite, and the various Linde synthetic sieves. Ion exchange forms of zeolites are suitable. Other useful solids are siliceous earths such as diatomaceous earth, infusorial earth and kieselguhr; natural clays and clay-like materials such as kaolin and montmorillonite clays, bentonite, fuller's earth, Superfiltrol, bauxite, and Porocel, a type of clay. Also porous ceramic materials such as unglazed porcelain; and aluminum silicate selective adsorbents such as calcium aluminum silicate. Other materials are chamotte, asbestos, pumice, talc, activated carbon, bone char, charcoal, graphite, and hydrosilicates, particularly those of aluminum.

It will be understood that the invention is capable of obvious variations without departing from its scope.

In the light of the foregoing description, the following is claimed.

1. The process of making tertiary alcohols having an odd number of carbon atoms in the range of 5 to 9 carbons which comprises irradiating with nuclear radiation a flowing mixture of isopropanol and ethylene in the vapor phase at a pressure ranging from 0.1 to 10 atmospheres, a temperature of 100 to 300° C., and a mole ratio of isopropanol to ethylene initially in the range of 5:1 to 30:1, said radiation being applied to the reactants for a time ranging from 10 seconds to 1 minute so that the total dose applied to said reactants is about 0.1 to 0.5 megarad, forming liquid product containing said tertiary alcohols in which the total G value of said alcohols is in the range of 50 to 300, and separating and recovering said alcohols.

2. The process of making a product alcohol which comprises irradiating with high energy ionizing radiation a flowing mixture of reactants in the vapor phase at a pressure of about 0.1 to 10 atmospheres and a temperature sufficient to maintain the vapor phase, said reactants comprising a starting alcohol of fewer carbon atoms than said product alcohol and an olefinic hydrocarbon, the mole ratio of starting alcohol to olefinic hydrocarbon in said mixture initially being in the range of 0.5:1 to 40:1, and said radiation being applied to the reactants for a time of up to 2 minutes to provide a total dose of 0.1 to 30 megarads, forming liquid product containing said product alcohol at a G value in the range of 50 to 300, and separating and recovering said product alcohol.

3. A process of telomerizing a low molecular weight starting alcohol with a low molecular weight olefinic hydrocarbon to form at least one liquid product alcohol of higher molecular weight than the starting alcohol which comprises forming a flowing mixture of said reactants in the vapor phase, the mole ratio of alcohol to olefinic hydrocarbon in the mixture being at least 5:1, irradiating said mixture for a time of up to 2 minutes with nuclear radiation from a nuclear reactor comprising a mixed field of neutrons and gamma rays while shielding the mixture from fission fragments, thereby forming said product alcohol, forming the same at a higher G value than if said mixture were in the liquid phase, and recovering said product.

4. Process of claim 3 in which said starting alcohol has a tertiary hydrogen atom.

5. Process of claim 4 in which said tertiary hydrogen atom and the —OH group of the alcohol are attached to one and the same carbon atom.

6. Process of claim 4 in which said tertiary hydrogen atom and the —OH group of the alcohol are attached to different carbon atoms.

7. Process of claim 3 in which the starting alcohol has up to 6 carbons.

8. Process of claim 3 in which the starting alcohol and the olefinic hydrocarbon have up to 6 carbons.

9. A process of telomerizing a low molecular weight starting alcohol with a low molecular weight olefinic hydrocarbon to form at least one liquid product alcohol having more carbon atoms than the starting alcohol which comprises froming a flowing mixture of the reactants in the vapor phase having a mole ratio of alcohol to olefinic hydrocarbon initially of at least 5:1, subjecting the mixture to the radiation from a nuclear reactor for a time of up to 2 minutes while shielding the reactants from fission fragments so that a total dose of mixed neutrons and gamma radiation of at least 0.1 megarad is applied to said reactants, forming as a consequence of said steps at least one product alcohol at a G value of up to about 300, and separating and recovering said product alcohol in a state substantially free of radioactivity.

10. Process of claim 9 in which said flowing mixture makes contact with an energy absorbing and transferring substance during the irradiating step.

11. Process of claim 10 in which said energy absorbing and transferring substance is an inorganic microporous solid having a surface area of at least 1 sq. m./gm.

12. Process of claim 10 in which said energy absorbing and transferring substance is a rare gas added to said flowing mixture prior to irradiation, said gas comprising at least 50 mole percent of the mixture and being selected from the group consisting of argon, helium, and neon.

13. The process of making tertiary alcohols having at least 5 carbon atoms which comprises irradiating with nuclear radiation a flowing mixture of isopropanol and ethylene in the vapor phase for a time of up to 2 minutes and at a mole ratio of isopropanol to ethylene initially of at least 5:1 so that a total dose of at least 0.1 megarad is applied to said reactants, forming liquid product containing said tertiary alcohols in which the total G value of said alcohols is up to about 300, and separating and recovering said alcohols.

14. The process of making liquid product alcohols which comprises irradiating with nuclear radiation a flowing mixture of a low molecular weight starting alcohol and a low molecular weight olefinic hydrocarbon in the vapor phase for a time of up to 2 minutes, said starting alcohol having fewer carbon atoms than said product alcohols, and thereby forming said product alcohols at a higher yield than if said mixture were in the liquid phase.

15. The process of making telomers having predominantly less than 12 carbon atoms which comprises forming a flowing mixture of a low molecular weight alcohol and a low molecular weght olefinic hydrocarbon in the vapor phase, exposing the reactants in said mixture to nuclear irradiation for a period of time ranging from 10 seconds to two minutes, and subsequently separating and recovering said telomers.

References Cited
UNITED STATES PATENTS

| | | | |
|---|---|---|---|
| 2,650,253 | 8/1953 | Rust et al. | 204—158 |
| 2,981,670 | 4/1961 | Stoops et al. | 204—162 |
| 3,030,288 | 4/1962 | Stoops | 204—162 |
| 3,071,524 | 1/1963 | Schutze et al. | 204—162 |
| 3,092,561 | 6/1963 | Lampe | 204—157.1 |
| 3,228,850 | 1/1966 | Fellows | 204—158 |

HOWARD S. WILLIAMS, *Primary Examiner.*

UNITED STATES PATENT OFFICE
CERTIFICATE OF CORRECTION

Patent No. 3,398,075                                August 20, 1968

Edwin O. Guernsey et al.

It is certified that error appears in the above identified patent and that said Letters Patent are hereby corrected as shown below:

Column 2, line 44, "suitable" should read -- suitably --; line 46, "line Any" should read -- line. Any --. Column 3, line 71, "0.1 to 0.2 to 1" should read -- 0.1 or 0.2 to 1 --. Column 4, line 17, beginning with "The radiation" cancel all to and including "nuclear reactors." in line 26, same column 4, and insert -- The radiation may be obtained from various sources including natural radioactive materials, which emit alpha, beta, and gamma radiation; from nuclear fission by-products of process in which atomic power is generated, these by-products including elements having atomic numbers ranging from 30 to 63; from materials made radioactive by exposure to neutron radiation, suc as cobalt-60, cesium-137, sodium-24, manganese-56, gadolinium-72 lanthanum-140, etc.; or from operating nuclear reactors. --; line 26, "particlest" should read -- particles --. Column 7, line 36, "1.93" should read -- 1.83 --. Column 8, line 3, "Gel-types" should read -- Gel-type --. Column 9, line 6, "hydrocarbon have" should read -- hydrocarbon each have --; line 10, "froming" should read -- forming --.

Signed and sealed this 3rd day of February 1970.

(SEAL)
Attest:

EDWARD M. FLETCHER, JR.                        WILLIAM E. SCHUYLER, JR.
Attesting Officer                                 Commissioner of Patents